United States Patent
Samukawa et al.

(10) Patent No.: US 7,271,880 B2
(45) Date of Patent: Sep. 18, 2007

(54) OBJECT RECOGNITION APPARATUS DESIGNED TO DETECT ADHESION OF DIRT TO RADAR

(75) Inventors: Yoshie Samukawa, Kariya (JP); Mamoru Shimamoto, Nagoya (JP); Tadashi Hyodo, Okazaki (JP); Toyohito Nozawa, Kariya (JP); Yoshiaki Hoashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 433 days.

(21) Appl. No.: 10/868,910

(22) Filed: Jun. 17, 2004

(65) Prior Publication Data

US 2004/0257556 A1 Dec. 23, 2004

(30) Foreign Application Priority Data

Jun. 20, 2003 (JP) ............................. 2003-176820

(51) Int. Cl.
*G01C 3/08* (2006.01)
(52) U.S. Cl. ...................... 356/4.01; 356/4.02; 356/4.1
(58) Field of Classification Search ................ 356/4.01
See application file for complete search history.

(56) References Cited

U.S. PATENT DOCUMENTS

| 4,931,767 A | | 6/1990 | Albrecht et al. |
| 5,489,149 A | | 2/1996 | Akasu |
| 5,515,156 A | * | 5/1996 | Yoshida et al. ............. 356/5.01 |
| 5,627,511 A | | 5/1997 | Takagi et al. |
| 5,754,099 A | * | 5/1998 | Nishimura et al. ......... 340/435 |
| 5,805,527 A | | 9/1998 | Hoashi et al. |
| 6,147,637 A | | 11/2000 | Morikawa et al. |

FOREIGN PATENT DOCUMENTS

| JP | A-H01-134232 | 5/1989 |
| JP | A-H05-052952 | 3/1993 |
| JP | A-H06-289134 | 10/1994 |
| JP | A-H06-342071 | 12/1994 |
| JP | A-H08-122437 | 5/1996 |
| JP | A-H09-236661 | 9/1997 |

(Continued)

OTHER PUBLICATIONS

Notification of Reasons for Rejection from Japanese Patent Office issued on Mar. 7, 2006 for the corresponding Japanese patent application No. 2003-176820 (a copy and English translation thereof).

(Continued)

*Primary Examiner*—Thomas H. Tarcza
*Assistant Examiner*—Luke D. Ratcliffe
(74) *Attorney, Agent, or Firm*—Posz Law Group, PLC

(57) ABSTRACT

An object recognition apparatus for vehicles is provided which is equipped with a radar. The apparatus is designed to detect adhesion of any dirt to the radar which will disturbs emission of radar waves to and reception radar echoes from a target. When the number of radar waves is great which cause the times required by the radar waves to travel to and return from a target to be measured as being shorter than a predetermined period of time and the intensities of the radar returns to be greater than a predetermined value, it is determined that the dirt is adhered to the radar, thereby improving the accuracy of detecting the adhesion of dirt to the radar.

12 Claims, 7 Drawing Sheets

FOREIGN PATENT DOCUMENTS

| | | |
|---|---|---|
| JP | A-H09-238062 | 9/1997 |
| JP | A-H10-020021 | 1/1998 |
| JP | A-H10-142335 | 5/1998 |
| JP | A-H10-213650 | 8/1998 |
| JP | A-H11-014754 | 1/1999 |
| JP | A-H11-94946 | 4/1999 |
| JP | A-2000-035479 | 2/2000 |
| JP | A-2000-046948 | 2/2000 |
| JP | 2002-22827 | 1/2002 |
| JP | A-2003-039973 | 2/2003 |
| JP | A-2003-114277 | 4/2003 |

OTHER PUBLICATIONS

Office Communication dated Oct. 18, 2006 issued from Japanese Patent Office for a counterpart application No. 2003-176820.

* cited by examiner

OBJECT RECOGNITION APPARATUS DESIGNED TO DETECT ADHESION OF DIRT TO RADAR

BACKGROUND OF THE INVENTION

1. Technical Field of the Invention

The present invention relates generally to an object recognition apparatus for vehicles equipped with a radar working to track and recognize an object such as leading vehicles, and more particularly to such an object recognition apparatus designed to detect the presence of any dirt which is adhered to the radar as an obstacle to emission of a radar wave or reception of a radar return.

2. Background Art

Japanese Patent First Publication No. 2002-22827 teaches an automotive object recognition apparatus equipped with a radar which works to emit radar waves such as laser beams over an angular range defined in front of a radar-installed vehicle and receive returns of the radar waves from an object to recognize the object. This type of apparatus is used in, for example, an automotive system designed to sound an alarm when the distance to a leading vehicle falls within a warning range or to control the speed of the radar-installed vehicle so as to keep the distance to the leading vehicle at a selected value.

Radars used in the above type of object recognition apparatus usually have a glass or resinous protective cover installed on a front surface of the radar through which radar waves are emitted in order to protect it from environmental conditions. Therefore, adhesion of dirt such as dust to the protective cover may result in error in transmission of laser light through the protective cover, thereby reducing the ability to track or recognize an object.

Installation of a light-sensitive element on an optical path on which a return of a radar wave reflected by the dirt travels is proposed to detect the adhesion of dirt to the protective cover. This proposal, however, encounters the drawback in that the adhesion of dirt such as sherbet ice or snow may cause the laser light to partly transmit through the dirt or scatter outside the dirt without reflection thereof to the light-sensitive element, thus resulting in an error in sensing the reflected laser light.

SUMMARY OF THE INVENTION

It is therefore a principal object of the invention to avoid the disadvantages of the prior art.

It is another object of the invention to provide an object recognition apparatus for vehicles equipped with a radar which is designed to detect dirt such as sherbet ice, snow, water droplets, grains of calcium chloride dispersed over a road surface, or some sort of clay adhered to the radar which may result in disturbance in transmission of a radar output or reception of a radar return.

According to one aspect of the invention, there is provided an object recognition apparatus for a vehicle designed to detect the presence of any dirt which will disturb emission of radar waves. The object recognition apparatus comprises: (a) a radar working to emit a plurality of radar waves over an angular range defined in front of a vehicle equipped with the object recognition apparatus, the radar receiving returns of the radar waves reflected by an object to produce receive signals as functions of intensities of the returns of the radar waves; (b) a time measuring circuit working to measure a time required by each of the radar waves to travel to and return from the object; (c) an intensity determining circuit working to determining the intensities of the returns of the radar waves using the receive signals; (d) an object recognition circuit working to recognize the object based on the radar waves emitted and the returns thereof received by the radar; and (e) a dirt detecting circuit working to detect adhesion of dirt to the radar. The dirt detecting circuit determines that the dirt is adhered to the radar when a first condition is met wherein the number of the radar waves which cause the times, as measured by the time measuring circuit, to be shorter than a predetermined period of time and the intensities of the returns, as determined by the intensity determining circuit, to be greater than a predetermined value is greater than or equal to a first value.

The adhesion to the radar of dirt such as sherbet ice, snow, water droplets, grains of calcium chloride dispersed over a road surface, or some sort of clay may cause the radar wave to partly transmit through the dirt or be scattered outside the dirt without reflection thereof to inside the radar. The part of the radar wave propagated through the dirt may return to the radar. Additionally, the part of the radar wave scattered outside the dirt may be reflected by a body of the vehicle (e.g., a garnish) and also return to the radar. Such a radar wave returning to the radar will cause the time, as measured by the time measuring circuit, to be shorter than the time the radar wave takes to travel to and return from a target to the radar. The more dirt, the more returns of radar waves to the radar. Based on the above fact, the dirt detecting circuit determines that dirt is adhered to the radar when the first condition is met wherein the times, as measured by the time measuring circuit, are shorter than the predetermined period of time and the intensities of the returns, as determined by the intensity determining circuit, are greater than the predetermined value is greater than or equal to the first value.

In the preferred mode of the invention, when the number of the radar waves which cause the times, as measured by the time measuring circuit, to be shorter than the predetermined period of time and the returns thereof to have the intensities greater than the predetermined value decreases below a second value smaller than the first value after a determination that the dirt is adhered to the radar is made, the dirt detecting circuit cancels the determination that the dirt is adhered to the radar. The above event usually occurs when the dirt drops from the radar. Thus, in this case, it is advisable that the dirt detecting circuit cancel the determination that the dirt is adhered to the radar.

The radar is designed to cyclically emit the radar waves at given time intervals over the angular range. The dirt detecting circuit may determine that the dirt is adhered to the radar when the first condition wherein the number of the radar waves which cause the times, as measured by the time measuring circuit, to be shorter than the predetermined period of time and the intensities of the returns, as determined by the intensity determining circuit, to be greater than the predetermined value is greater than or equal to the first value continues for a first period of time. This results in improved accuracy of determining that the dirt is adhered to the radar.

When, after the determination that the dirt is adhered to the radar is made, a condition where the number of the radar waves which cause the times, as measured by the time measuring circuit, to be shorter than the predetermined period of time and the intensities of the returns, as determined by the intensity determining circuit, to be greater than the predetermined value decreases below a second value smaller than the first value continues for a second period of time, the dirt detecting circuit may cancel the determination that the dirt is adhered to the radar. The second period of time is preferably shorter than the first period of time.

The object recognition apparatus may further comprise a radar range determining circuit working to determine a radar range at which the object recognition circuit is enabled to recognize the object. When a second condition wherein the radar range, as determined by the radar range determining circuit, decreases below a predetermined first range is met as well as meeting of the first condition, the dirt detecting circuit may determine that the dirt is adhered to the radar. If the dirt is adhered to the radar, but it is still possible to recognize the object correctly, there is no need for detecting the adhesion of dirt and informing a vehicle operator of such an event. It is thus advisable that the degree of ability to recognize the object be analyzed using a change in the radar range, and the dirt be determined to be adhered to the radar when the first and second conditions are both satisfied.

When the radar range increases above a second range longer than the first range after the determination that the dirt is adhered to the radar is made, the dirt detecting circuit may cancel the determination. Specifically, the fact that the radar range increases above the second range means that the dirt is removed at least partly from the radar. Therefore, when such an event is met, the dirt detecting circuit preferably cancels the determination that the dirt is adhered to the radar.

When a third condition is met, wherein after elapse of the predetermined period of time following emission of a radar wave from the radar, the radar receives no return of the radar wave, as well as meeting the first condition, the dirt detecting circuit may make the determination that the dirt is adhered to the radar.

When after elapse of the predetermined period of time following emission of a radar wave from the radar, the radar receives a return of the radar wave, the dirt detecting circuit may cancel the determination that the dirt is adhered to the radar.

The third condition continues for a third period of time, the dirt detecting circuit makes the determination that the dirt is adhered to the radar. When the third condition is met, it may be concluded that the whole of a radar wave emitting surface of the radar is covered with dirt. The accuracy of detecting the adhesion of dirt to the radar is, therefore, achieved by making the determination that the dirt is adhered to the radar when the third condition continues for the third period of time.

When a condition continues for a fourth period of time, the condition being wherein after elapse of the predetermined period of time following emission of the radar wave from the radar, the radar receives the return of the radar wave, the dirt detecting circuit may cancel the determination that the dirt is adhered to the radar. The fourth period of time is preferably shorter than the third period of time.

The object recognition circuit may exclude one of the returns of the radar waves which has been received within the predetermined period of time following emission of the radar wave from use in recognizing the object.

The intensity determining circuit works to compare each of the receive signals with a given threshold to determine an intensity of the receive signal as the intensity of a corresponding one of the returns of the radar waves. The time measuring circuit measures as the time an interval between a time instant when, after rising above the given threshold, the intensity of each of the receive signals falls and passes the given threshold after rising the given threshold and emission of a corresponding one of the radar waves.

When the dirt detecting circuit has determined that the dirt is adhered to the radar, the object recognition circuit is prohibited from recognizing the object.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED
EMBODIMENTS

Figure 1:
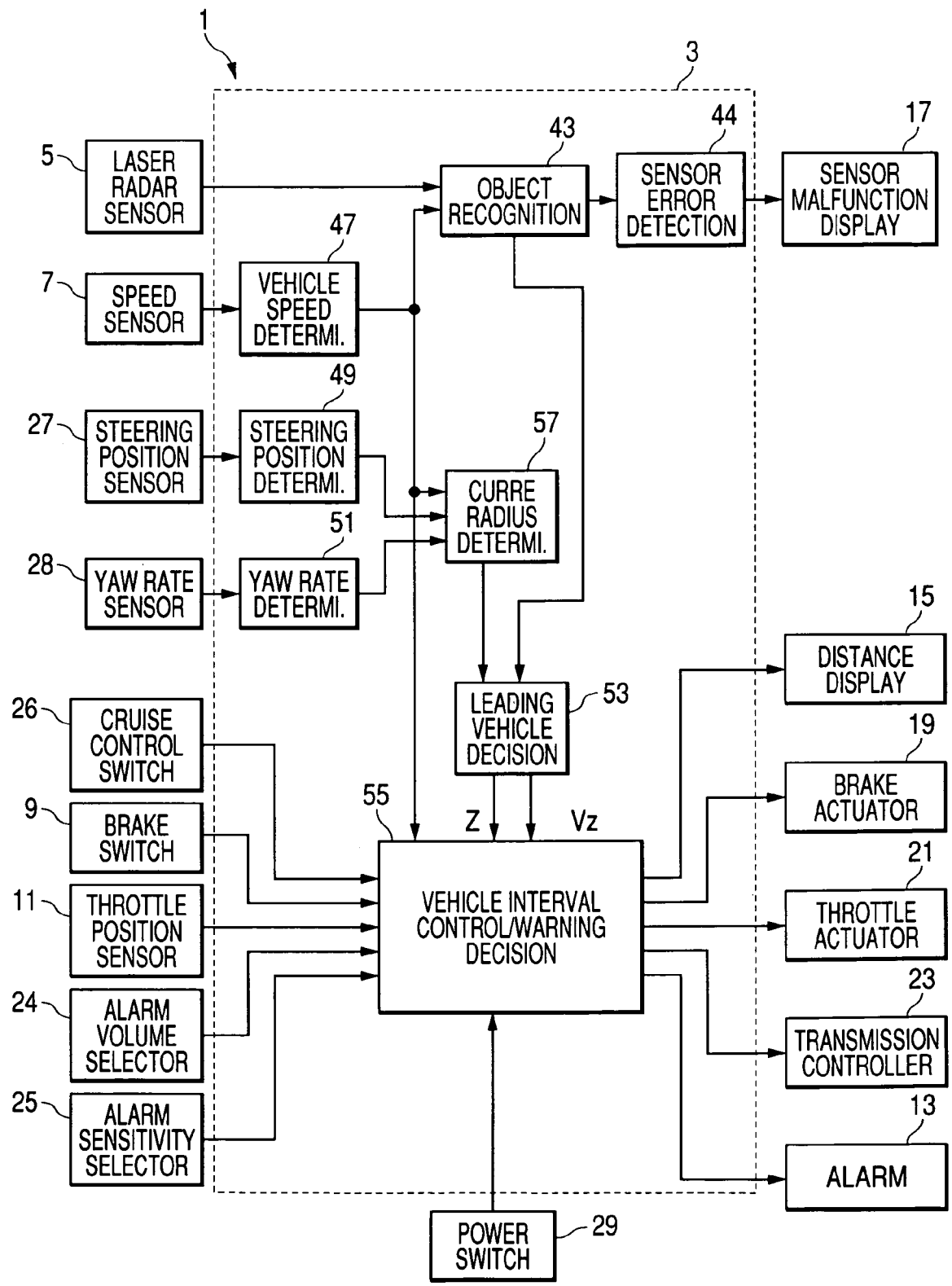
FIG. 1 is a block diagram which shows an automotive intervehicle distance control system equipped with an object recognition system according to the invention.

Referring to the drawings, wherein like reference numbers refer to like parts in several views, particularly to FIG. 1, there is shown an automotive intervehicle distance control system 1 equipped with an object recognition system according to the invention. The intervehicle distance control system 1 is designed to keep the interval between a vehicle equipped with the intervehicle distance control system 1 (will be referred to as a system vehicle below) and a leading vehicle at a selected one and give a vehicle operator an alarm when an obstacle is found within a frontal warning zone.

The intervehicle distance control system 1 includes a recognition/cruise control ECU 3 which is made up of a microcomputer, input/output interfaces, etc. The hardware can be of any known arrangements, and explanation thereof in detail will be omitted here.

The recognition/cruise control ECU 3 receives outputs from a laser radar sensor 5, a vehicle speed sensor 7, a brake switch 9, and a throttle position sensor 11 and outputs drive signals to an alarm 13, a distance display 15, a sensor malfunction display, a brake actuator 19, a throttle actuator 21, and an automatic transmission controller 23. The recognition/cruise control ECU 3 is coupled to an alarm volume selector 24, an alarm sensitivity selector 25, a cruise control switch 26, a steered position sensor 27, and a yaw rate sensor 28. The alarm volume selector 24 is designed to regulate the volume on the alarm 13. The alarm sensitivity selector 27 is designed to regulate the sensitivity of an alarm decision operation. The steering position sensor 27 works to measure an angular position of a steering wheel (not shown) of the system vehicle and output a signal indicative thereof to the recognition/cruise control ECU 3. The yaw rate sensor 28 works to measure a yaw rate of a body of the system vehicle and output a signal indicative thereof to the recognition/cruise control ECU 3. The recognition/cruise control ECU 3 also includes a power switch 29 which is turned on to initiate given operations of the ECU 3.

Figure 2:
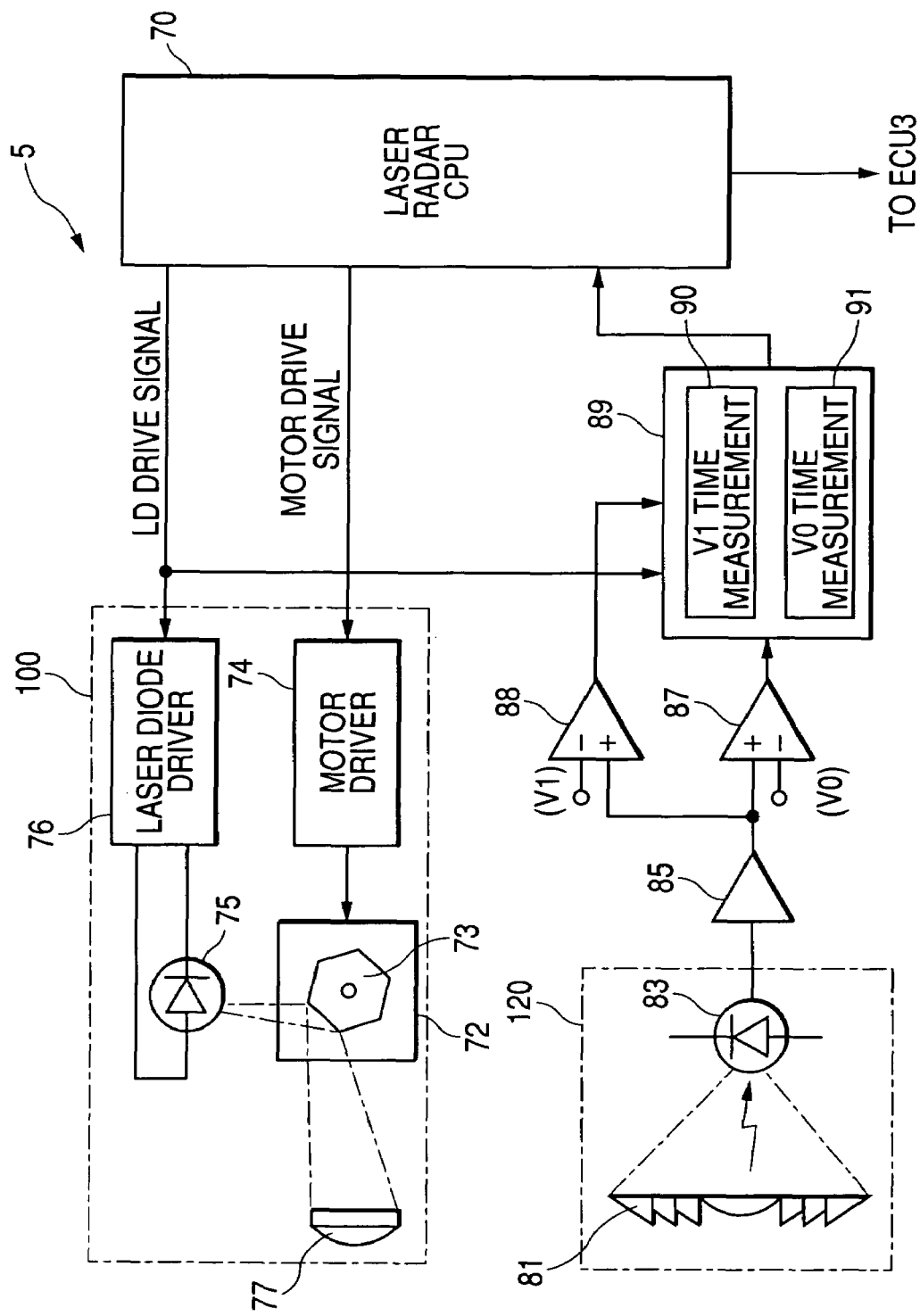
FIG. 2 is a block diagram which shows a laser radar sensor installed in an object recognition system of the invention.

The laser radar sensor 5, as clearly shown in FIG. 2, consists of a CPU 70, a transmitter 100, and a receiver 120. The transmitter 100 is made up of a scanner 72, a motor driver 74, a semiconductor laser diode 75, a laser diode driver 76, and a lens 77. The laser diode driver 76 is responsive to a laser diode (LD) drive signal from the CPU 70 to activate the laser diode 75 to emit laser beams in the form of radar pulses through the scanner 72 and the lens 77. The scanner 72 has a polygon mirror 73 which is rotatably supported by a vertically extending shaft and moved horizontally by an electric motor (not shown) to have the laser beams scan a frontal detection area over a given angle. The electric motor is controlled by the motor driver 74 in response to a motor drive signal from the CPU 70. The rotational position of an output shaft of the electric motor (i.e., the angular position of the polygon mirror 73) is monitored by a motor position sensor (not shown) and inputted to the CPU 70.

Figure 3:
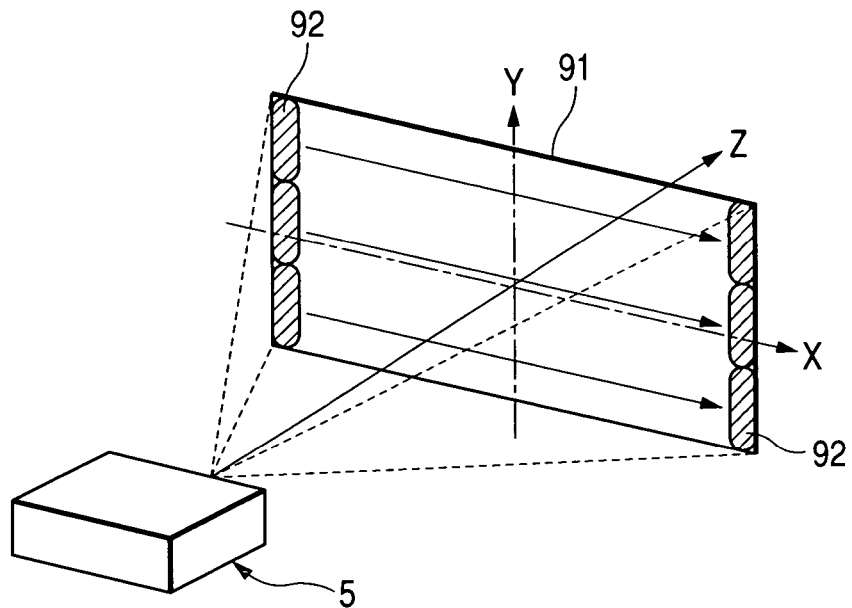
FIG. 3 is a perspective view which shows a scan pattern of laser beams emitted by the laser radar sensor, as illustrated in FIG. 2.

The polygon mirror 73 is made up of three types of reflective mirrors which are inclined at three different angles and rotated to sweep the laser beams horizontally (i.e., a width-wise direction of the system vehicle) and shift them vertically (i.e., a height-wise direction of the system vehicle) in a discontinuous manner, thereby scanning the frontal detection zone two-dimensionally. FIG. 3 illustrates a scan pattern of the laser beams emitted by the laser radar sensor 5. For the brevity of illustration, cross sections of only the laser beams emitted to the right and left sides of the detection zone 91 are represented by hatched portions 92. The laser beams may be oval or rectangular in cross section. The laser radar sensor 5 may be replaced with another type of radar using a millimeter or ultrasonic wave.

In FIG. 3, if the central optical axis of the laser radar sensor 5 is defined as Z-axis, an X-Y area or detection zone 91 defined perpendicular to the Z-axis is scanned in sequence by laser beams. In this embodiment, Y-axis indicates an elevation of the detection zone 91, while X-axis indicates the direction in which scanning lines extend horizontally. The X-Y area is defined by 0.08°×201 laser pulses (i.e., approximately 16°) in the X-axis direction and 1.4°×3 scanning lines in the Y-axis direction (i.e., approximately 4°). The scan is performed from left to right and from top to bottom of the detection zone 91. In practice, 201 laser beams are first emitted at an interval of 0.08° along the uppermost scanning line (i.e., the first scanning line) in the X-axis direction. Upon reaching the right end of the uppermost scanning line, that is, upon completion of scan of the first scanning line, 201 laser beam are next emitted at an interval of 0.08° along the second scanning line immediately below the first scanning line. Finally, the third scanning line is scanned in the same manner. Specifically, the scans are performed up to the three scanning lines to derive 201 laser beams×3 scanning lines=603 data components in the laser radar sensor 5.

The recognition/cruise control ECU 3 receives the 603 data components from the laser radar sensor 5 and determines horizontal and vertical scanning angles θx and θy of each of the emitted laser beams and a time lag between emission of each of the laser beams and reception of a corresponding one of returns of the laser beams (i.e., the distance to a tracked object). The horizontal scanning angle θx is the angle which a line of an output laser beam projected onto the X-Z plane makes with the Z-axis. The vertical scanning and θy is the angle which a line of the output laser beam projected onto the Y-Z plane makes with the Z-axis.

The receiver 120 of the laser radar sensor 5 includes a lens 81 and a light-sensitive element 83. The lens 81 receives a return of the laser beam reflected from an object present in the detection zone 91 and directs it to the light-sensitive element 83. The light-sensitive element 83 works to produce a voltage signal having a level as a function of the intensity of the return of the laser beam. The laser radar sensor 5 also has a laser-transmitting glass plate or resinous plate (not shown) installed on the surface thereof to cover the transmitter 100 and the receiver 120 for protecting the transmitter and the receiver 120 from environmental conditions.

The voltage signal outputted by the light-sensitive element 83 is amplified in an amplifier 85 and then inputted to comparators 87 and 88. The comparator 87 works to compare the output of the amplifier 85 with a reference voltage V0 and provide an output to a timer circuit 89 when the output of the amplifier 85 is greater than the reference voltage V0. The reference voltage V0 is provided for minimizing adverse effects of noises on the output of the amplifier 85 and will also be referred to as a lower threshold V0 below. The comparator 88 works to compare the output of the amplifier 85 with a reference voltage V1 and provide an output to the timer circuit 89 when the output of the amplifier 85 is greater than the reference voltage V1. The reference voltage V1 is set to a voltage level equivalent to the output of the amplifier 85 when a return of the laser beam from, for example, a typical reflector installed on the rear of automotive vehicles is received and will be also referred to as an upper threshold V1 below.

Figure 7:
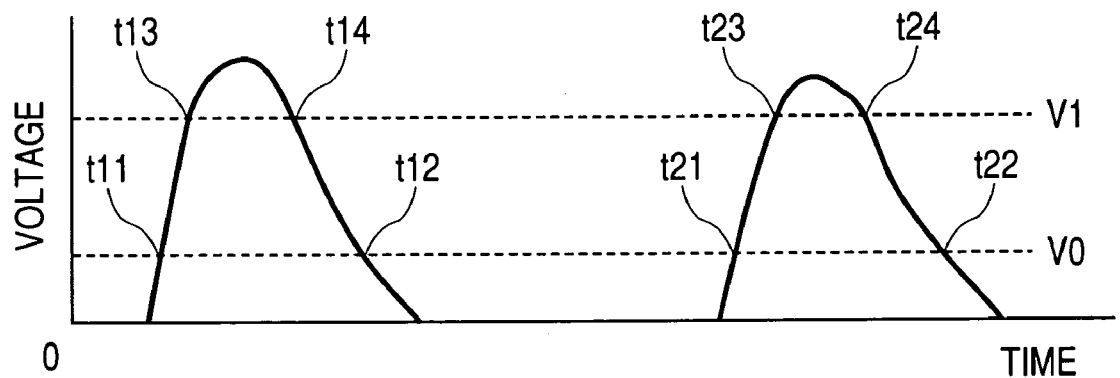
FIG. 7 is an illustration which shows the waveform of returns of laser pulses received by a laser radar sensor, as illustrated in FIG. 2.

The timer circuit 89 is made up of a V1 measuring section 90 and a V0 measuring section 91. The V1 measuring section 90 works to measure time instants when the output voltage of the amplifier 85 rises above and falls below the upper threshold V1, respectively. The V0 measuring section 91 works to measure time instants when the output voltage of the amplifier 85 rises above and falls below the lower threshold V0, respectively. Each of the V1 measuring section 90 and the V0 measuring section 91 is designed to measure and hold a maximum of four time instants. For example, when two returns of laser pulses are, as illustrated in FIG. 7, received by the receiver 120, the V1 measuring section 90 measures four time instants t13, t14, t23, and t24. Similarly, the V0 measuring section 91 measures four time instants t11, t12, t21, and t22.

The timer circuit 89 also receives, as clearly shown in FIG. 2, a drive signal outputted from the laser radar CPU 70 to the laser diode driver 76. The timer circuit 89 measures an input time instant ts at which the drive signal is inputted thereinto, codes the input time instant ts and the time instants t11 to t14 and t21 to t24 into binary digital signals, and outputs them to the laser radar CPU 70. The binary digital signals will also be referred to as time data below.

The laser radar CPU 70 works to determine the distance to a tracked object using the time data on the input instant ts and the maximum of eight time instants t11 to t14 and t21 to t24 and provide radar data on the distance, the scanning angles θx and θy, and a received light intensity Δt, as will be described below, to the recognition/cruise control ECU 3.

Figure 8:
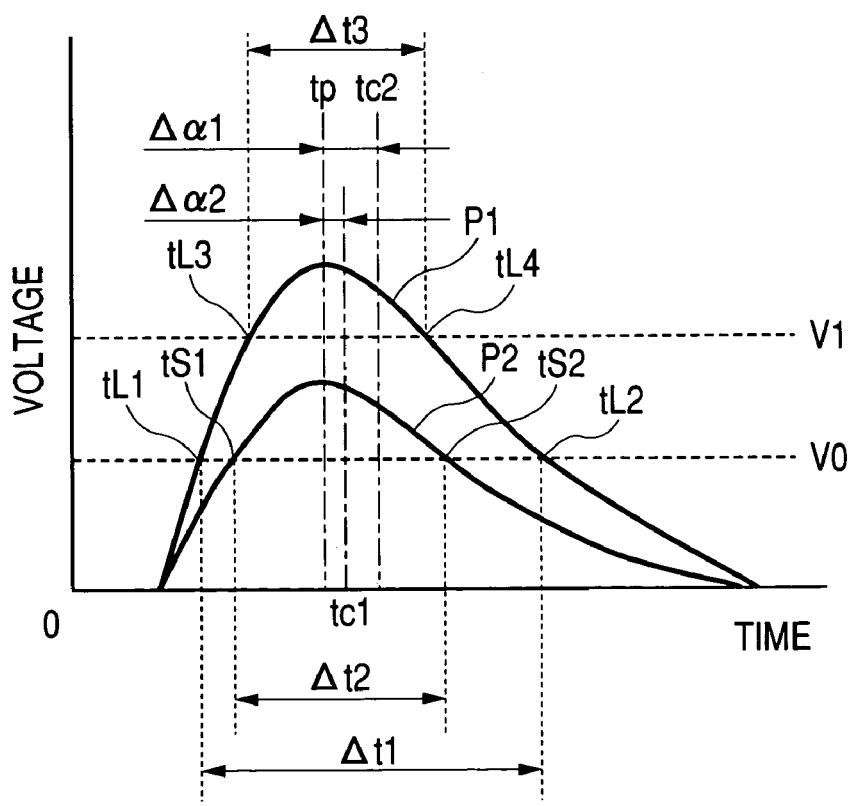
FIG. 8 is an illustration which shows changes in voltage levels of returns of laser pulses received by a laser radar sensor, as illustrated in FIG. 2.

FIG. 8 demonstrates two light pulses (i.e., returns of radar waves) received by the receiver 120 which have different intensities. P1 indicates one of the received light pulses having a higher intensity. P2 indicates the other received light pulse having a lower intensity.

In the following discussion, the time when the light pulse P1 rises and exceeds the lower threshold V0 in the comparator 87 is defined as tL1. The time when the light pulse P1 falls and passes the lower threshold V0 is defined as tL2. A difference between the times tL1 and tL2 is defined as Δt1. The time when the light pulse P2 rises and exceeds the lower threshold V0 is defined as tS1. The time when the light pulse P2 falls and passes the lower threshold V0 is defined as tS2. A difference between the times tS1 and tS2 is defined as Δt2. The time when the light pulse P1 rises and passes the upper threshold V1 in the comparator 88 is defined as tL3. The time when the light pulse P1 falls and passes the upper threshold V1 is defined as tL4. A difference between the times tL3 and tL4 is defined as Δt3.

As apparent from the drawing of FIG. 8, the time difference Δt1 corresponding to a pulse width of the light pulse P1 having a higher intensity and the time difference Δt2 corresponding to a pulse width of the light pulse P2 having a lower intensity meet a relation of Δt1>Δt2. Specifically, the magnitudes of the time differences Δt1 and Δt2 which are determined by the time instants tL1, tL2, tS1, and tS2 when the light pulses P1 and P2 pass the lower threshold V0 are functions of intensities of the light pulses P1 and P2. When the intensity of each of the light pulses P1 and P2 is low, it results in a decreased value of a corresponding one of the time differences Δt1 and Δt2. Conversely, when the intensity of each of the light pulses P1 and P2 is high, it results in an increased value of a corresponding one of the time differences Δt1 and Δt2. The time differences Δt1 and Δt2 may, thus, be used as parameters indicating the intensities of light pulses received by the receiver 120.

The time intermediate between the times tL1 and tL2 is defined as tc2. The time intermediate between the times tS1 and tS2 is defined as tc1. The time when the light pulses P1 and P2 reach a maximum voltage level is defined as tp. A difference between the intermediate time tc2 and the time tp is defined as Δα1. A difference between the intermediate time tc1 and the time tp is defined as Δα2. The time differences Δα1 and Δα2 will also be referred to as a correction time below.

Figure 9:
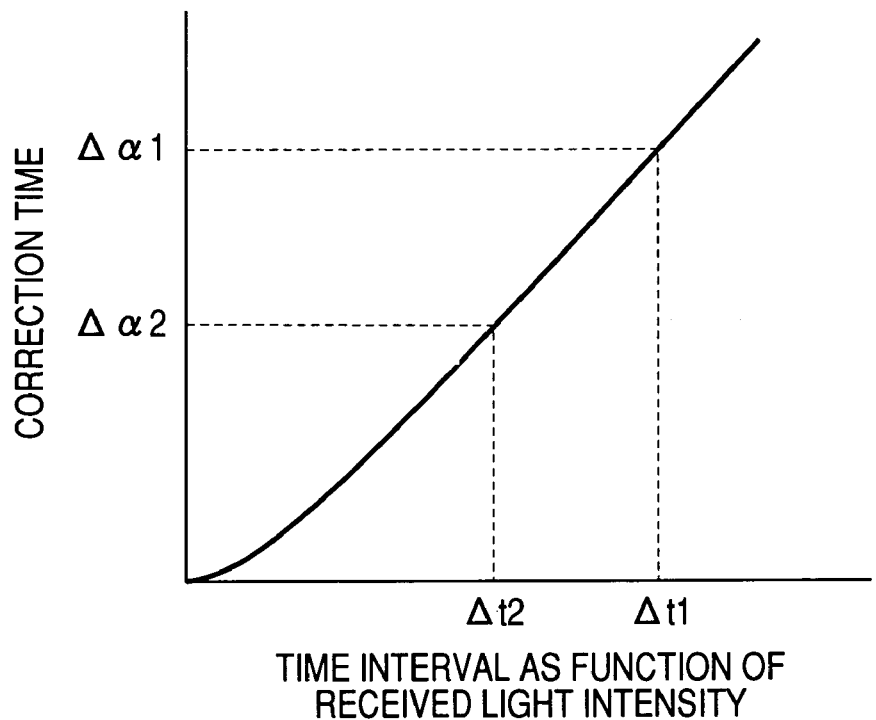
FIG. 9 is a graph which shows relations between correction times and time intervals, as illustrated in FIG. 8.

The time differences Δt1 and Δt2 that are functions of the intensities of the light pulses P1 and P2 bear a specific relation to the correction times Δα1 and Δα2. Specifically, when the time differences Δt1 and Δt2 increase, as shown in FIG. 9, the correction times Δα1 and Δα2 increase in proportion. A determination of the time tp when the light pulses P1 and P2 reach the maximum voltage level is, therefore, accomplished by finding the relation between the time differences Δt1 and Δt2 and the correction times Δα1 and Δα2 experimentally, looking up the correction times Δα1 and Δα2 in that relation which correspond to instant values of the time differences Δt1 and Δt2, and adding the correction times Δα1 and Δα2 to the intermediate times tc2 and tc1. Upon determination of the time tp, the laser radar CPU 70 calculates the distance to a tracked object using an interval between the time ts when the laser diode 75 is activated to emit a laser beam and the time tp when a return of the laser beam reaches the maximum voltage level.

The use of the correction times Δα1 and Δα, therefore, serves to eliminate a measurement error arising from a difference in intensity between returns of the laser beams. The distance to a tracked object is determined as a function of the interval between emission of a laser beam and the time when received light pulses having different intensities reach the maximum voltage level simultaneously. The laser radar CPU 70 stores in a ROM a map representing the relation between the time differences Δt1 and Δt2 and the correction times Δα1 and Δα2.

In a case where a light pulse L1 (i.e., a return of the radar wave) received by the receiver 120 has a higher intensity, so that it passes the upper threshold V1, the distance to a tracked object may also be determined by finding a difference Δt11 between the time tL3 when the light pulse L1 rises above the upper threshold V1 and the time tL4 when the light pulse L1 falls blow the upper threshold V1 and the time tc22 intermediate between the times tL3 and tL4, looking up the correction time in a map in terms of the time difference Δt11, and correcting the intermediate time tc22 using the correction time to derive the time when the light pulse L1 reaches a maximum voltage level.

The timer circuit 89, as described above, outputs the maximum of eight time instants t11 to t14 and t21 to t24 to the laser radar CPU 70. The laser radar CPU 70 does not use all the time instances t11 to t14 and t21 to t2, i.e., two light pulses received by the receiver 120 to determine the distance to a target, but selects one of the light pulses arising from the target which is required to be measured in distance thereto and determines, as described above, the intermediate time, the correction time, and the time instant when the light pulse reaches a maximum voltage level thereof. Such selection of one of received light pulses results in a decreased operation time of the laser radar CPU 70. How to select one of two received light pulses will be described later in detail.

The recognition/cruise control ECU 3 works to recognize or identify an object tracked by the laser radar sensor 5 based on the radar data outputted from the laser radar CPU 70 and output drive signals to the brake actuator 19, the throttle actuator 21, and the automatic transmission controller 23 based on the status of the object if identified as a leading vehicle to control the speed of the system vehicle in the intervehicle distance control. When the tracked object such as a vehicle traveling ahead of the system vehicle, a stationary vehicle, a guardrail, or a pole standing on the side of a road continues to fall within a warning zone for a preselected period of time, the recognition/cruise control ECU 3 sounds the alarm 13.

Referring back to FIG. 1, the recognition/cruise control ECU 3 includes an object recognition block 43, a sensor error block 44, a vehicle speed determining block 47, a steering position determining block 49, a yaw rate determining block 51, a curve radius determining block 57, a leading vehicle detecting block 53, and a vehicle interval control/warning decision block 55.

The object recognition block 43 works to receive from the laser radar sensor 5 the radar data on the distance to a tracked object and the horizontal and vertical scanning angles θx and θy associated with the tracked object and transfer it to a point in an X-Y-Z cartesian coordinate system whose origin (0, 0, 0) is set on the center of the laser radar sensor 5 and which is defined by an X-axis extending in a width-wise direction of the system vehicle, a Y-axis extending in a height-wise direction of the system vehicle, and a Z-axis extending in a longitudinal direction of the system vehicle. The radar data produced by a return of a laser beam having a light intensity lower than a given level is omitted from the above coordinate transformation. The coordinate data in the X-Y-Z Cartesian coordinate system is subjected to a sequence of three operations: pre-segmentation, main segmentation, and object identification, as described later in detail, to produce radar data on each object present in front of the system vehicle.

The object recognition block 43 uses the radar data to determine coordinates (x, y, z) of the central position of and the size data (W, H, D) on a tracked object. A time-sequential change in the central position (x, y, z) of the object is used to determine the speed (Vx, Vy, Vz) of the object relative to the system vehicle. The object recognition block 43 also uses the speed of the system vehicle outputted from the vehicle speed determining block 47, as calculated using an output of the speed sensor 7, and the relative speed (Vx, Vy, Vz) of the object to determine whether the object is a stationary object or a moving one. The size data (W, H, D) indicates the length of sides of a minimum rectangular parallelepiped containing therein the object geometrically (i.e., width, height, and depth of the rectangular parallelepiped). The object having such a size data will also be referred to as a target model below.

The sensor error block 44 monitors the data, as derived in the object recognition block 43 and determines whether it lies in a preselected error range or not. If so, the fact that the data, as derived in the object recognition block 43, is incorrect, that is, that the laser radar sensor 5 is malfunctioning is indicated through a sensor malfunction display 17. The object recognition block 43 also works, as described later in detail, to determine whether dirt such as sherbet ice, snow, water droplets, grains of calcium chloride dispersed over a road surface, or some sort of clay is adhered to the surface of the laser radar sensor 5 or not. If such dirt is detected, it is indicated through the sensor malfunction display 17.

The steering position determining block 49 works to determine a steered angle or steering position of the steering wheel of the system vehicle using an output of the steering position sensor 27. The yaw rate determining block 51 works to determine a yaw rate of the system vehicle using an output of the yaw rate sensor 28. The curve radius determining block 57 works to determine the radius R of curvature of a road on which the system vehicle is now traveling using the speed of the vehicle, as determined in the vehicle speed determining block 47, the steering position, as determined in the steering position determining block 49, and the yaw rate, as determined in the yaw rate determining block 51. The leading vehicle detecting block 53 works to select one of leading vehicles closest to the system vehicle using the coordinates (x, y, z) of central positions, the size data (W, H, D), and relative speeds (Vx, Vy, Vx) of tracked objects, as derived in the object recognition block 43 and determine the distance Z to and relative speed Vz of the selected leading vehicle.

The vehicle interval control/warning decision block 55 works to determine in an alarm mode whether an alarm is to be raised or not or determine in a cruise mode the contents of speed control based on the distance Z to and the relative speed Vz of the tracked leading vehicle, the status of the cruise control switch 26, a braking effort, as detected by the brake switch 9, the position of the throttle valve, as measured by the throttle position sensor 11, the sensitivity of the alarm decision operation, as selected by the alarm sensitivity selector 25. If it has been concluded that an alarm needs to be raised, the vehicle interval control/warning decision block 55 outputs an on-signal to the alarm 13. Alternatively, the vehicle interval control/warning decision block 55, in the cruise mode, provides drive signals to the automatic transmission controller 23, the brake actuator 19, and the throttle actuator 21 to perform given cruise control. The vehicle interval control/warning decision block 55 informs the driver of the system vehicle of which of the alarm mode and the cruise mode is now entered.

Figure 4:
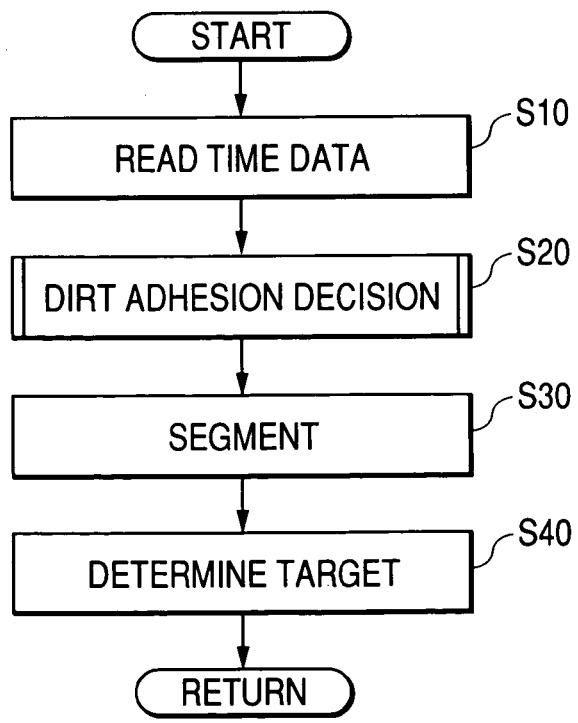
FIG. 4 is a flowchart of a main program executed by an object recognition system of the invention.

A determination of whether dirt is adhered to the laser radar sensor 5 or not and a recognition of a tracked object, as made in the laser radar CPU 70 and the object recognition block 43 will be described below. FIG. 4 is a flowchart representing a main program of operations to be executed in the laser radar CPU 70 and the objection recognition block 43.

After entering the program, the routine proceeds to step 10 wherein the time data is read out of the laser radar sensor 5 in units of the scanning lines. A total scan cycle in which the laser radar sensor 5 scans the three scanning lines is 100 msec.

The routine proceeds to step 20 wherein the time data, as read out in step 10, is analyzed to determine whether dirt is adhered to the laser radar sensor 5 or not. If it is concluded that the dirt is not adhered to the laser radar sensor 5, the radar data on the distance to a tracked object, the vertical and horizontal scanning angles θx and θy associated with the tracked object, and the received light intensity Δt, as described above, is outputted. The routine proceeds to step 30 wherein the pre-segmentation operation is performed. The pre-segmentation operation is to collect ones of data elements on the above described three-dimensional position of the target model which meet given grouping conditions into a group to produce a pre-segment. When a given number of such pre-segments are produced, ones of them meeting given coupling conditions are collected to produce a main segment. For example, when ones of dots, as defined in the above described X-Y-Z cartesian coordinate system, which meet a first condition wherein the distance ΔX between two of the dots in the X-axis direction is less than or equal to 0.2 m and a second condition wherein the distance ΔZ between two of the dots in the Z-axis direction is less than or equal to 2 m are grouped to produce each of the pre-segments. The detection zone 91 is, as described above, scanned along the three scanning lines overlaid in the Y-axis direction. The pre-segments are, thus, defined each time one of the three scanning lines is scanned. The main segmentation operation is to collect ones of the pre-segments which are close to each other within a three-dimensional space defined in the X-Y-Z cartesian coordinate system to produce the main segment. The main segment is a rectangular parallelepiped defined by three sides extending parallel to the X-axis, Y-axis, and Z-axis, respectively, and has data on coordinates (X, Y, Z) of the center and lengths (W, H, D) of the three sides of the rectangular parallelepiped. In the following discussion, the main segment will also be referred to as segment data. For example, U.S. Pat. No. 6,593,873 B2, assigned to the same assignees as that of this application, teaches an example of how to make the segment data, the disclosure of which is totally incorporated herein by reference.

The routine proceeds to step 40 wherein a target determining operation is performed to determine whether each acquired object should be tracked as a target. The target is an object model defined by the segment as derived in step 30. Specifically, in step 40, the position (X, Y, Z) of the center and the size (W, H, D) of each acquired object are determined from the segment data as derived in step 30. A change in the position (X, Y, Z) per unit time is also calculated to determine the speed (Vx, Vy, Vz) of the object relative to the system vehicle. Further, it is determined whether the object is moving or at rest. The central positions (X, Y, Z) and the types of the objects are analyzed to determine whether each of the objects is some obstacle to traveling of the system vehicle or not. Each of the objects, as determined as such an obstacle, is finally identified as the target model. The data on the target models are outputted from the object recognition block 43 to the leading vehicle detecting block 53.

Figure 5:
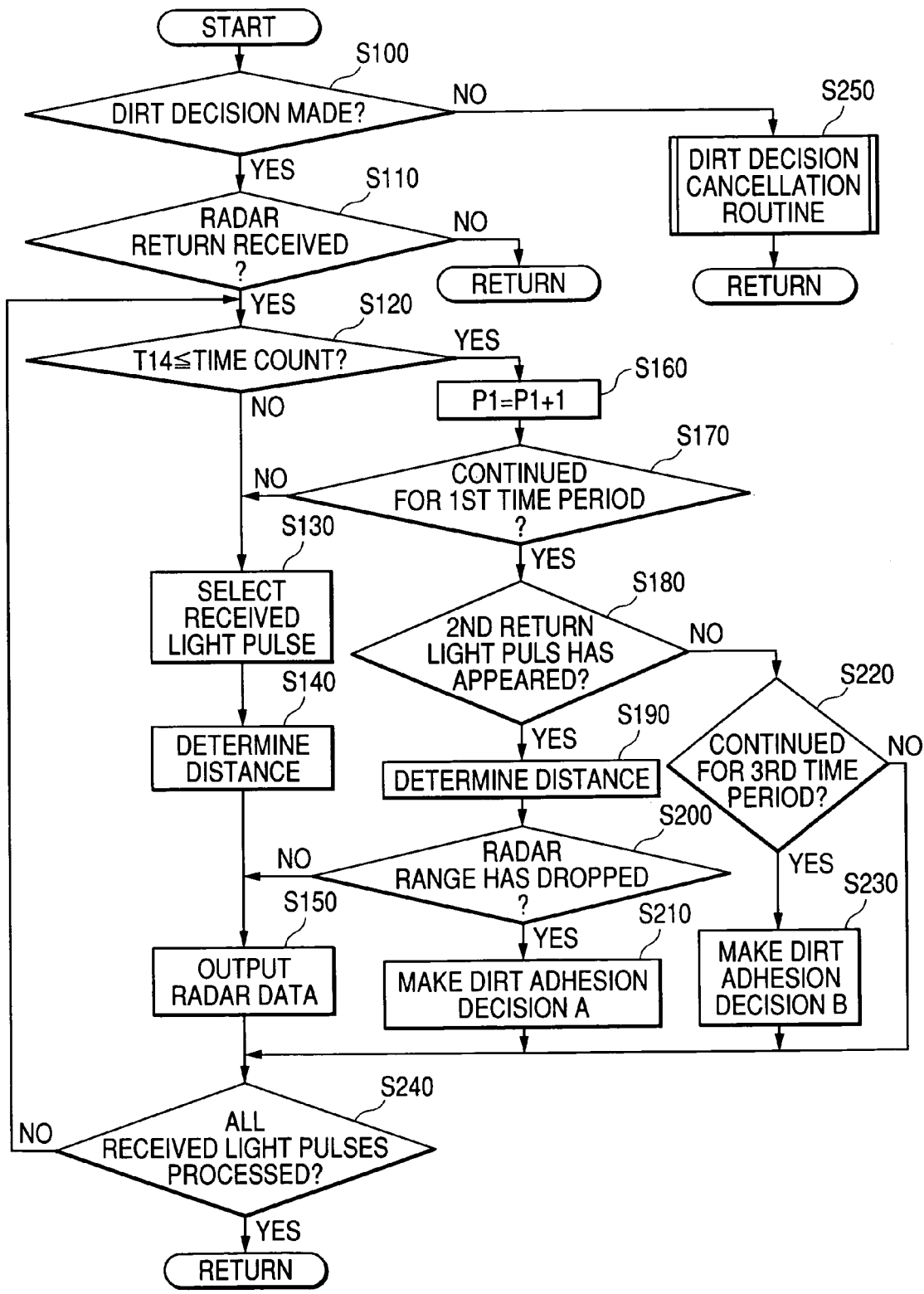
FIG. 5 is a flowchart of a sub-program executed by an object recognition system of the invention to detect adhesion of any dirt to the radar laser sensor, as illustrated in FIG. 1.
Figure 6:
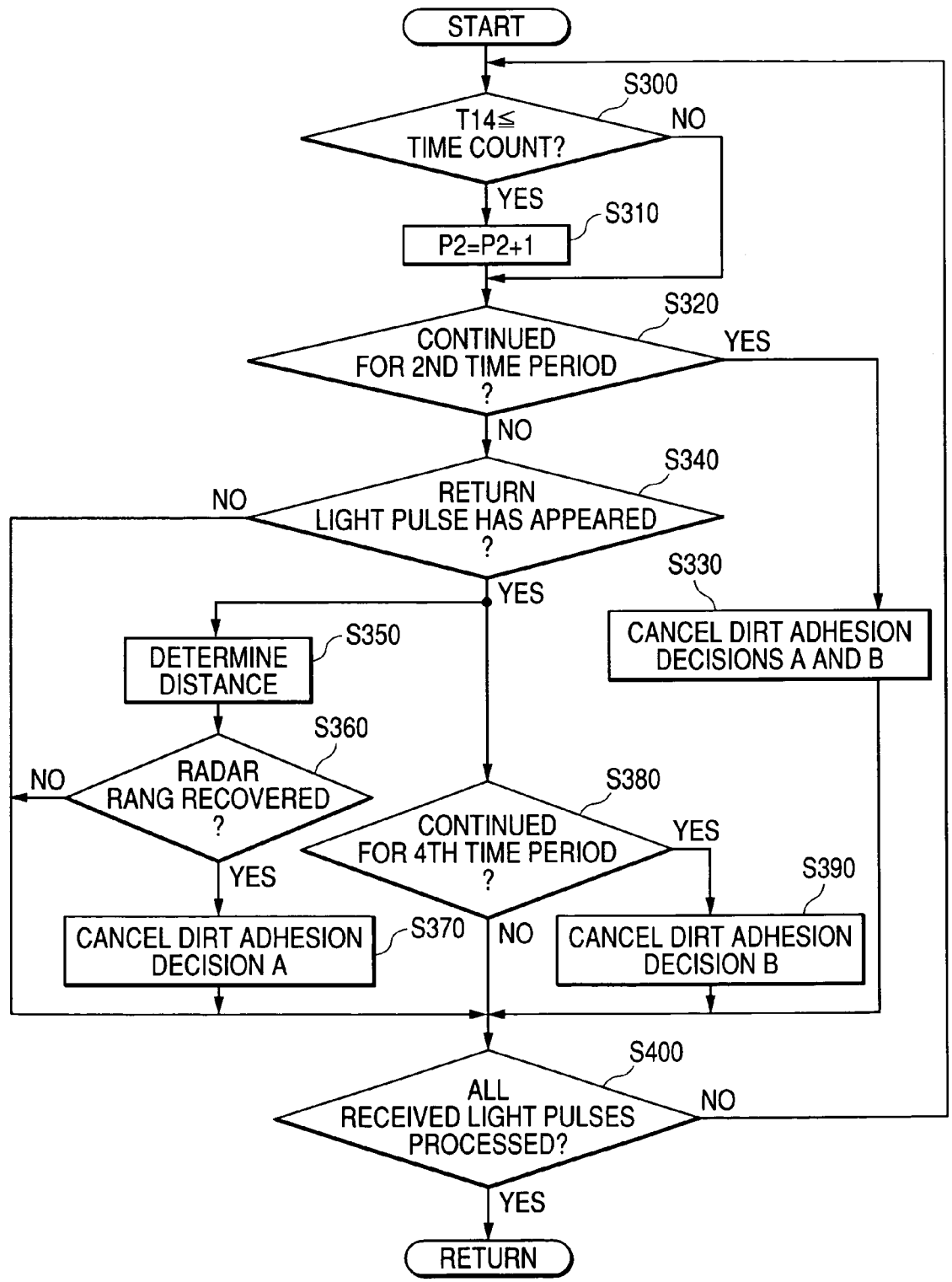
FIG. 6 is a flowchart of a sub-program executed to cancel a determination of dirt is adhered to the laser radar sensor, as illustrated in FIG. 1.
Figure 10:
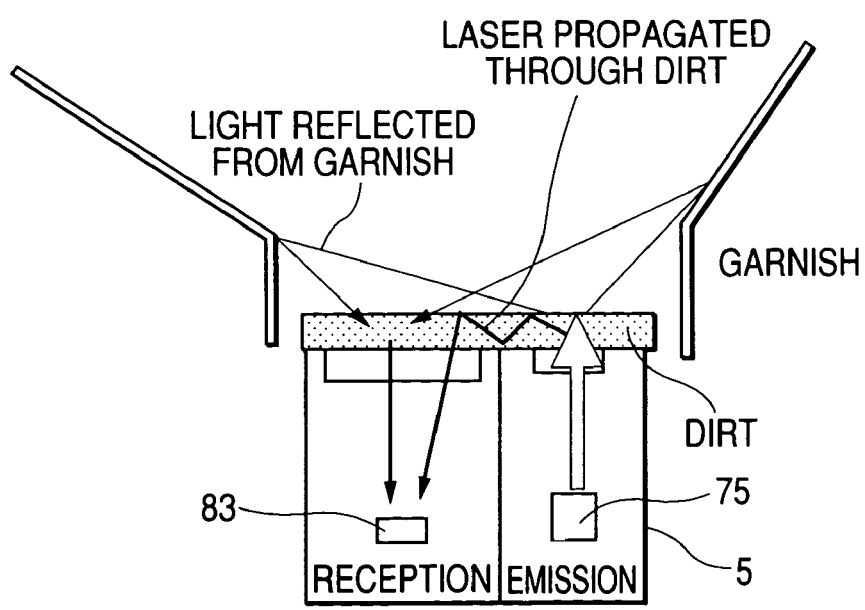
FIG. 10 is an explanatory view which shows reflection of laser beams in the presence of dirt adhered to a radar.

The operations in step 20 will be described in detail below with reference to flowcharts of FIGS. 5 and 6. The flowchart of FIG. 5 represents the operation to sense some dirt adhered to the surface of the laser radar sensor 5 through which a radar beam (i.e., a laser beam) and a radar echo passes. The flowchart of FIG. 6 represents the operation to terminate the dirt-sensing operation when the surface of the laser radar sensor 5 is cleaned off for some reason after the dirt is determined to be adhered thereto. Prior to describing the operations in step 20, the behavior of a laser beam emitted from the laser diode 75 when dirt such as sherbet ice or snow is attached to the surface of the laser radar sensor 5 will be discussed below with reference to FIG. 10.

When any dirt is attached to the surface of the laser radar sensor 5, it may cause a fraction of an emitted laser beam to be propagated through the dirt or scattered by the dirt. The fraction of the laser beam scattered within the dirt or emitted out of the dirt and reflected by a body of the system vehicle (e.g., garnish) partly falls on the light-sensitive element 83. This causes a time interval between emission of a laser beam and reception of a return of the laser beam to be decreased greatly. When more dirt is attached to the surface of the laser radar sensor 5, a greater portion of the laser beam is incident on the light-sensitive element 83 immediately after emitted from the transmitter 100 of the laser radar sensor 5.

Based on the fact as described above, the laser radar CPU 70 determines that dirt such as sherbet ice or snow has been attached to the surface of the laser radar sensor 5 when the number of returns of laser beams incident on the light-sensitive element 83 exceeds a preselected value. This will be described below in detail with reference to the flowchart of FIG. 5.

First, in step 100, it is determined whether a decision that any dirt is adhered to the surface of the laser radar sensor 5 has been made or not in step 210 or 230, as described later. If a YES answer is obtained, then the routine proceeds to step 250 wherein the operation, as illustrated in FIG. 6, is initiated. Alternatively, if a NO answer is obtained in step 100, then the routine proceeds to step 110 wherein it is determined whether there is a return(s) of radar pulses (will also be referred to as a return light pulse below) received by the receiver 120 or not, that is, whether a return(s) of radar pulses emitted over the first scanning line in the detection zone 91 has been received by the receiver 120, and the time data thereon has been inputted to the laser radar CPU 70 from the timer circuit 89 or not. If a NO answer is obtained meaning that there is no return light pulse, then the routine returns back to step 100. Alternatively, if a YES answer is obtained, then the routine proceeds to step 120 wherein it is determined whether the time T14 that is a difference between the input time instant ts at which the drive signal is inputted to the timer circuit 89 and a time instant t14 at which the return light pulse falls in voltage level and passes the upper threshold V1 is smaller than or equal to a given time count or not. The time count is so selected as to be longer than the time required for a return of a radar pulse incident on the light-sensitive element 83 immediately after emitted due to dirt on the surface of the laser radar sensor 5 to reach the upper threshold V1 and be shorter than the time required for a return of a radar pulse from an object present within the detection zone 91 in front of the system vehicle to reach the upper threshold V1. Usually, in a case where an object exists in the proximity to the laser radar sensor 5, a difference between the time required for a radar return therefrom to reach the upper threshold V1 and the time required for a dirt-caused radar return to reach the upper threshold V1 is very small, but however, the radar return from the object has a greater light intensity, so that the peak thereof is greatly different from that of the dirt-caused radar return, thus resulting in a great difference between times when the radar return from the object and the dirt-caused radar return fall in voltage level, as illustrated in FIG. 8, below the upper threshold V1. The determination of whether a radar return has arisen from an object within the detection zone 91 or dirt on the surface of the laser radar sensor 5 is, therefore, be made by comparing the time instant t14 at which the radar return falls in voltage level and passes the upper threshold V1 as a radar return reception time with the given time count.

The V1 measuring section 90 is designed to measure a maximum of four time data (i.e., the time instants, as illustrated in FIG. 7). When four time data are inputted to the laser radar CPU 70, the time T14 that is an interval between the input time instant ts and the time instant t14 when a first one of return light pulses falls in voltage level and passes the upper threshold V1 is compared with the given time count in step 120. If the V1 measuring section 90 measures only two time data on one return light pulse, one of them falling in voltage level and passing the upper threshold V1 is used to define the time T14.

When the time T14 is lower than or equal to the given time count, it may be concluded that any dirt is adhered to the laser radar sensor 5, and a return light pulse received by the receiver 120 has arisen from the dirt. Specifically, an increase in radar pulses propagated through the dirt or subjected to reflection on the garnish of the system vehicle results in appearance of a return light pulse(s) exceeding the upper threshold V1 in voltage level thereof. The fact that the return light pulse has exceeded the upper threshold V1 may, thus, be used to determine that the surface of the laser radar sensor 5 is dirty. Specifically, a determination of whether a higher intensity of the return light pulse is caused by the adhesion of dirt to the laser radar sensor 5 may be made by monitoring whether the return light pulse has risen above and then fallen below the upper threshold V1 or not.

If a YES answer is obtained in step 120 meaning that the time T14 is less than or equal to the given time count, the routine proceeds to step 160 wherein a count value P1 is incremented by one (1). The routine then proceeds to step 170 wherein it is determined whether the time during which the count value P1 is greater than a first value (e.g., 100) has reached a first period of time (e.g., five sec.) or not. Specifically, the program of FIG. 5 is executed in units of the scanning lines. The transmitter 100 emits 201 laser pulses over each of the scanning lines. It is determined in step 170 whether 100 returns of the laser pulses meeting the condition in step 120, that is, arising from the dirt on the laser radar sensor 5 continue to appear or not. If a YES answer is obtained, it may be concluded that dirt such as ices occupies at least half the detection zone 91. The routine then proceeds to step 180 and following steps to determine that the ability of the laser radar sensor 1 has been reduced.

In step 180, it is determined whether another return light pulse has appeared after the elapse of the first period of time or not using the time data as acquired after the elapse of the first period of time. If there is a return light pulse at least exceeding the lower threshold V0 in voltage level thereof, it is determined as a second return light pulse which has appeared after the elapse of the first period of time. If a YES answer is obtained meaning that the second return light pulse has appeared, then the routine proceeds to step 190 wherein the distance to a tracked object is determined using the time data on the second return light pulse, and the light intensity $\Delta t$ of the second return light pulse is also determined. The routine proceeds to step 200 wherein it is determined whether a radar range has decreased below a first range (e.g., 55 m) or not using a relation between the distance and light intensity, as derived in step 190. The radar range, as referred to herein, is a maximum distance within which the laser radar sensor 5 is effective in detecting objects.

How to find the radar range will be described below.

The radar range is calculated based on the distance to an object present ahead of the system vehicle when the system vehicle has approached and begun to acquire it or the distance to an object at the moment it has moved away from the system vehicle so that the laser radar sensor 5 has lost it. In practice, the radar range, as used herein, is determined by an average of the above distances to a plurality objects.

In order to eliminate the effect of an automotive vehicle, which shows the reflection intensity different from an object being acquired and has cut in front of the system vehicle, on the calculation of the radar range, only the radar range, as calculated using the light intensity $\Delta t$ lower than a given level, is employed. Usually, the light intensity (i.e., the brightness) of a return of a laser beam from an object changes as a function of the distance to the object. Specifically, an increase in the distance to the object results in a decrease in the light intensity $\Delta t$ of a return of a laser beam from the object, while a decrease in the distance to the object results in an increase in the light intensity $\Delta t$. Using this fact, the radar range may be determined accurately.

If a plurality of returns of laser beams have appeared when the laser radar sensor 5 has begun to acquire an object or lost it, the greatest of light intensities $\Delta t$ of the returns is preferably compared with the above given level. An increase in accuracy of determining the radar range is achieved by calculating it when the relative speed of a leading vehicle traveling straight at a speed higher than a preselected value is greater than or equal to 5 km/h.

If a YES answer is obtained meaning that the radar range has decreased, then the routine proceeds to step 210 wherein a dirt adhesion decision A is made to conclude that the ability of the laser radar sensor 5 has partially been reduced by the adhesion of dirt to the laser radar sensor 5. Simultaneously, such an event is indicated on the sensor malfunction display 17. The object recognition and intervehicle distance control are also prohibited in the recognition/cruise control ECU 3.

If it is determined in step 180 that the second return light pulse still does not appear, then the routine proceeds to step 220 wherein it is determined whether step 180 continues to make the negative answer for a third period of time (e.g., 20 seconds) or not. If a YES answer is obtained meaning that any return light pulses other than those arising from the dirt have not appeared for a while, and the dirt is adhered to almost the entire surface of the laser radar sensor 5, thus making it impossible to detect or acquire any objects existing ahead of the system vehicle, then the routine proceeds to step 230 wherein a dirt adhesion decision B is made to conclude that the laser radar sensor 5 has been disenabled completely by the adhesion of dirt to the laser radar sensor 5. Simultaneously, such an event is indicated on the sensor malfunction display 17. The object recognition and intervehicle distance control are also prohibited in the recognition/cruise control ECU 3.

Alternatively, if a NO answer is obtained in step 220, then the routine proceeds to step 240 wherein it is determined whether all return light pulses within a range of one of the scanning lines have been processed or not. If a NO answer is obtained, then the routine returns back to step 120.

If a NO answer is obtained in step 120 meaning that the time T14 is more than the given time count, and the return light pulse is lower in voltage level than the upper threshold V1, so that a time instant the return light pulse passes the upper threshold V1 is not yet measured, then the routine proceeds to step 130. Alternatively, if a NO answer is obtained in step 170, the routine also proceeds to step 130.

In step 130, one of the return light pulses is selected for use in determining the distance to a tracked object. The timer circuit 89 can measure the eight time instants (e.g., the time instants t11 to t14 and t21 to t22 in FIG. 7) on two return light pulses and output them to the laser radar CPU 70. Use of all the eight time instants results in an increased operation load on the laser radar CPU 70. Thus, one of the return light pulses is selected which is more suitable for determining the distance to the tracked object. Specifically, any return light pulse which meets one of conditions wherein the time T14 that is a difference between the input time instant ts when the drive signal is inputted to the timer circuit 89 and the time instant t14 when the return light pulse falls in voltage level below the upper threshold V1 is shorter than the given time count and wherein the return light pulse is not greater than the upper threshold V1, but the time T12 that is an interval between the input time instant ts and the time instant t12 the return light pulse reaches the lower threshold V0 is shorter than the given time count is excluded from use in determining the distance to the tracked object. If any return light pulse following the above one has appeared which at least exceeds the lower threshold V0, it is selected for use in determining the distance to the tracked object. Alternatively, if there are no return light pulses which do not meet either of the above conditions, the distance is not calculated.

If there are two return light pulses which have the time data acquired after the elapse of the given time count, one of them which has appeared first is selected. If there is only one single return light pulse which has the time data acquired after the elapse of the given time count, it is selected.

After step 130, the routine proceeds to step 140 wherein the time data on the return light pulse selected in step 130 is analyzed to determine the distance to the tracked object, and the light intensity $\Delta t$ of the return light pulse is also calculated. After the distance is found in step 140 or it is determined in step 200 that the radar range does not drop below the first range, the routine proceeds to step 150 wherein the radar data on the distance, as derived in step 140 or 190, the scanning angles $\theta x$ and $\theta y$ of an emitted radar pulse causing the return light pulse used in step 140 or 190 and the light intensity $\Delta t$ is outputted to the recognition/cruise control ECU 3. The routine proceeds to step 240 wherein it is determined whether all return light pulses within a range of one of the scanning lines have been processed or not. If a YES answer is obtained, then the routine terminates in this program cycle.

The operation in step 250 will be described below with reference to FIG. 6.

After entering step 250, the routine proceeds to step 300 of FIG. 6 wherein it is determined, like in step 120, whether the time T14 (that is a difference between the input time instant is and the time instant t14 at which the return light pulse falls in voltage level below the upper threshold V1) is smaller than or equal to the given time count or not. Specifically, step 300 determines whether return light pulses arising from the dirt are still entering the light-sensitive element 83 or not. If a NO answer is obtained, then the routine proceeds directly to step 320. Alternatively, if a YES answer is obtained, then the routine proceeds to step 310 wherein a count value P2 is incremented by one (1). The routine then proceeds to step 320 wherein it is determined whether the time during which the count value P2 is lower than a second value (e.g., 40) has reached a second period of time (e.g., one sec.) shorter than the first period of time or not. If a YES answer is obtained, meaning that return light pulses arising from the adhesion of dirt to the laser radar sensor 5 have been decreased and concluding that the dirt has been removed from the laser radar sensor 5, then the routine proceeds to step 330 wherein the dirt adhesion decisions A and B in steps 210 and 230 are both cancelled. The sensor malfunction indication on the sensor malfunction display 17 is cleared. The recognition/cruise control ECU 3 is allowed to perform the object recognition and intervehicle distance control. The use of the second period of time in step 320 which is shorter than the first period of time (employed to determine whether any dirt is adhered to the laser radar sensor 5) permits the laser radar CPU 70 to resume acquiring the radar data on a tracked object immediately after the dirt is removed from the laser radar sensor 5.

Alternatively, if a NO answer is obtained in step 320, then the routine proceeds to step 340 to determine whether the radar ability of the laser radar sensor 5 has been recovered or not. Specifically, it is determined whether there is any return light pulse which has appeared after the elapse of the second period of time or not using the time data as acquired after the elapse of the second period of time. If a YES answer is obtained, then the routine proceeds to steps 350 and 380.

In step 350, the time data on the return light pulse, as detected in step 340, is analyzed to determine the distance to a tracked object, and the light intensity Δt of the return light pulse is also calculated. The routine proceeds to step 360 wherein the distance and the light intensity Δt, as derived in step 350, are analyzed to determine whether the radar range has been returned to a second range (e.g., 65 m) greater than the first range as used in the operation in step 200 or not. The radar range is calculated in the same manner as described in step 200.

If a YES answer is obtained in step 360 meaning that the ability of the laser radar sensor 5 has been recovered, then the routine proceeds to step 370 wherein the dirt adhesion decision A is cancelled. The use of the second range in step 360 which is shorter than the first range employed to determine in step 200 whether the radar range has been reduced or not permits the laser radar CPU 70 to resume acquiring the radar data on a tracked object immediately after the dirt is removed from the laser radar sensor 5.

In step 380, it is determined whether the time during which return light pulses having the time data, as acquired after the elapse of the second period of time are appearing has reached a fourth period of time (e.g., 3 sec.) shorter than the third period of time or not. If a YES answer is obtained concluding that the dirt covering almost the entire surface of the laser radar sensor 5 has been at least partly removed, thus having enabled the laser radar sensor 5 to acquire an object present ahead of the system vehicle correctly, then the routine proceeds to step 390 wherein the dirt adhesion decision B in step 230 is cancelled.

The use of the fourth period of time in step 380 which is shorter than the third period of time used in step 220 to make the dirt adhesion decision B in step 230 permits the laser radar CPU 70 to resume acquiring the radar data on a tracked object immediately after the dirt is at least partly removed from the laser radar sensor 5.

The routine proceeds to step 400 wherein it is determined whether all return light pulses within a range of one of the scanning lines have been processed or not. If a NO answer is obtained, then the routine returns back to step 300.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

For example, while, in the above embodiment, the determination that any dirt is adhered to the laser radar sensor is made when the two conditions: one related to the number of return light pulses assuming the light intensity Δt greater than the upper threshold V1, and the other related to the radar range or the absence of return light pulses produced after the elapse of the predetermined times are both satisfied, it may be made only using the former condition. The determination in step 170 of whether the condition in which the number of return light pulses showing the light intensity Δt greater than the upper threshold V1 exceeds the first value continues for the first period of time or not results in improved accuracy of detecting the adhesion of dirt to the laser radar sensor 5, but however, such a determination may be made before expiry of the first period of time.

The laser radar sensor 5 uses the scanner 72 equipped with the polygon mirror 73 which is, as described above, made up of the reflective mirrors inclined at different angles, but however, another type of scanner may alternatively be used which consists of a galvano mirror installed to sweep in a width-wise direction of the system vehicle and a drive mechanism working to change an inclination of a reflective surface of the mirror.

The object recognition block 43 of the recognition/cruise control ECU 3 works to transform the radar data on the distance to a tracked object and the horizontal and vertical scanning angles θx and θy associated with the tracked object, as represented in the polar coordinate system, to a point in the Cartesian coordinate system, but such transformation may alternatively be made in the laser radar sensor 5.

Instead of the laser radar sensor 5, another type of radar using a millimeter ultrasonic wave may be employed.

An additional light-sensitive element may also be employed which is designed to identify return light pulses arising from any dirt on the laser radar sensor 5.

What is claimed is:

1. An object recognition apparatus for a vehicle, comprising:

a radar working to emit a plurality of radar waves over an angular range defined in front of a vehicle equipped with the object recognition apparatus, said radar receiving returns of the radar waves reflected by an object to produce receive signals as functions of intensities of the returns of the radar waves;

a time measuring circuit working to measure times required by respective radar waves to travel to and return from the object;

an intensity determining circuit working to determining the intensities of the returns of the respective radar waves using the receive signals;

an object recognition circuit working to recognize the object based on the radar waves emitted by said radar and the returns received by said radar; and a dirt detecting circuit working to detect adhesion of dirt to said radar, said dirt detecting circuit determining that the dirt is adhered to said radar when a first condition is met, wherein the first condition is when a number of the respective radar waves is greater than or equal to a first value, the respective radar waves having times shorter than a predetermined period of time and having intensities of the returns greater than a predetermined value, the times being measured by said time measuring circuit, the returns being determined by said intensity determining circuit, wherein when said number of the respective radar waves decreases below a second value smaller than the first value after a determination is made that the dirt is adhered to said radar, said dirt detecting circuit cancels the determination that the dirt is adhered to said radar.

2. An object recognition apparatus for a vehicle comprising:

a radar working to emit a plurality of radar waves over an angular range defined in front of a vehicle equipped with the object recognition apparatus, said radar receiving returns of the radar waves reflected by an object to produce receive signals as functions of intensities of the returns of the radar waves;

a time measuring circuit working to measure times required by respective radar waves to travel to and return from the object;

an intensity determining circuit working to determining the intensities of the returns of the respective radar waves using the receive signals;

an object recognition circuit working to recognize the object based on the radar waves emitted by said radar and the returns received by said radar; and a dirt detecting circuit working to detect adhesion of dirt to said radar, said dirt detecting circuit determining that the dirt is adhered to said radar when a first condition is met, wherein the first condition is when a number of the respective radar waves is greater than or equal to a first value, the respective radar waves having times shorter than a predetermined period of time and having intensities of the returns greater than a predetermined value, the times being measured by said time measuring circuit, the returns being determined by said intensity determining circuit, wherein said radar is designed to cyclically emit the radar waves at given time intervals over the angular range, and wherein said dirt detecting circuit determines that the dirt is adhered to said radar when the first condition continues for a first period of time, wherein when after a determination that the dirt is adhered to said radar is made, a cancel condition continues for a second period of time, said dirt detecting circuit cancels the determination that the dirt is adhered to said radar, wherein said cancel condition is when the number of the respective radar waves decreases below a second value smaller than the first value, the respective radar waves having times shorter than the predetermined period of time and having intensities of returns greater than the predetermined value, the times being measured by said time measuring circuit and the intensities of the returns being determined by said intensity determining circuit, wherein the second period of time is shorter than the first period of time.

3. An object recognition apparatus as set forth in claim 1, further comprising a radar range determining circuit working to determine a radar range in which said object recognition circuit is effective in recognizing the object, and wherein when both a second condition and the first condition are met, said dirt detecting circuit determines that the dirt is adhered to said radar, wherein the second condition is when the radar range, as determined by said radar range determining circuit, decreases below a predetermined first range.

4. An object recognition apparatus as set forth in claim 3, wherein when the radar range increases above a second range longer than the first range after a determination is made that the dirt is adhered to said radar, said dirt detecting circuit cancels the determination.

5. An object recognition apparatus as set forth in claim 1, wherein when both a second condition and the first condition are met, said dirt detecting circuit makes a determination that the dirt is adhered to said radar, wherein the second condition is when said radar receives no return of a radar wave after elapse of the predetermined period of time following emission of the radar wave from said radar.

6. An object recognition apparatus as set forth in claim 5, wherein when after elapse of the predetermined period of time following emission of a radar wave from said radar, said radar receives a return of the radar wave, said dirt detecting circuit cancels the determination that the dirt is adhered to said radar.

7. An object recognition apparatus as set forth in claim 5, wherein said second condition continues for a third period of time, said dirt detecting circuit makes the determination that the dirt is adhered to said radar.

8. An object recognition apparatus as set forth in claim 7, wherein when a cancel condition continues for a fourth period of time, said dirt detecting circuit cancels the determination that the dirt is adhered to said radar, wherein said cancel condition is when said radar receives the turn of the radar wave after elapse of the predetermined period of time following emission of the radar wave from said radar.

9. An object recognition apparatus as set forth an claim 8, wherein the fourth period of time is shorter than the third period of time.

10. An object recognition apparatus as set forth in claim 1, wherein said object recognition circuit excludes one of the returns of the radar waves which has been received within the predetermined period of time following emission of the radar wave from use in recognizing the object.

11. An object recognition apparatus as set forth in claim 1, wherein said intensity determining circuit works to compare each of the receive signals with a given threshold to determine an intensity of the receive signal, the determined intensities being used as the intensity of a corresponding one of the returns, and wherein said time measuring circuit measures, after emission of corresponding respective radar waves, respective intervals between a time instant when the intensity of each of the receive signals rises above the given threshold, and the intensity of each of the receive signals falls and passes the given threshold, the measured intervals being used as said times.

12. An object recognition apparatus as set forth in claim 1, wherein when said dirt detecting circuit has determined that the dirt is adhered to said radar, said object recognition circuit is prohibited from recognizing the object.

* * * * *